US008850283B2

(12) United States Patent  
Niewczas et al.

(10) Patent No.: US 8,850,283 B2  
(45) Date of Patent: Sep. 30, 2014

(54) HARQ PROCEDURE WITH PROCESSING OF STORED SOFT-BITS

(75) Inventors: Jaroslaw Niewczas, Jozefow (PL); Viswanathan Bhojan, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 297 days.

(21) Appl. No.: 13/511,565

(22) PCT Filed: Nov. 12, 2010

(86) PCT No.: PCT/EP2010/067351  
§ 371 (c)(1),  
(2), (4) Date: Jul. 24, 2012

(87) PCT Pub. No.: WO2011/064106  
PCT Pub. Date: Jun. 3, 2011

(65) Prior Publication Data  
US 2013/0047051 A1 Feb. 21, 2013

(30) Foreign Application Priority Data

Nov. 30, 2009 (EP) .................................. 09177520

(51) Int. Cl.  
*H04L 1/18* (2006.01)  
*H04L 1/00* (2006.01)

(52) U.S. Cl.  
CPC ............ *H04L 1/1845* (2013.01); *H04L 1/0013* (2013.01); *H04L 1/1816* (2013.01); *H04L 1/1812* (2013.01); *H04L 1/1893* (2013.01)  
USPC ........................................................ 714/748

(58) Field of Classification Search  
CPC ... H04L 1/1816; H04L 1/1812; H04L 1/1845; H04L 1/1893; H04L 1/0013  
USPC .................. 714/748–751; 370/252, 262, 328  
See application file for complete search history.

(56) References Cited

U.S. PATENT DOCUMENTS 7,003,709 B2 * 2/2006 Wengerter et al. ............ 714/748  
7,372,837 B2 * 5/2008 Kinjo et al. .................... 370/338  
8,315,185 B2 * 11/2012 Chan ............................. 370/252

FOREIGN PATENT DOCUMENTS

EP 1168703 A2 1/2002  
EP 1482670 A1 12/2004  
(Continued)

OTHER PUBLICATIONS

3rd Generation Partnership Project. "3rd Generation Partnership Project; Technical Specification Group Radio Access Network; Evolved Universal Terrestrial Radio Access (E-UTRA) User Equipment (UE) radio access capabilities (Release 8)." 3GPP TS 36.306 V8.2.0, May 2008, Sophia Antipolis Valbonne, France.

(Continued)

*Primary Examiner* — Shelly A Chase  
(74) *Attorney, Agent, or Firm* — Coats & Bennett, PLLC

(57) ABSTRACT

It is described a method for determining a received data block by employing a Hybrid Automatic Repeat Request procedure. The described method comprises calculating (104) first soft-information values being associated with a first reception of the data block, storing the calculated first soft-information values in a first buffer (121), and calculating (104) second soft-information values being associated with a second reception of the data block, wherein the second reception results from a retransmission of the data block following the first reception. The described method further comprises rate matching (128) a first soft data block comprising the calculated and stored first soft-information values, rate matching (118) a second soft data block comprising the calculated second soft-information values, and decoding (152) a combination of the rate matched first soft data block and the rate matched second soft data block. It is further described a radio receiver arrangement, a computer-readable medium and a program element, which are all adapted for carrying out and/or for controlling the described received data block determination method.

14 Claims, 2 Drawing Sheets

(56) References Cited

FOREIGN PATENT DOCUMENTS

| EP | 2086152 A2 | 8/2009 | |
|---|---|---|---|
| EP | 2 323 302 A1 | * 11/2009 | ............... H04L 1/18 |

OTHER PUBLICATIONS

3rd Generation Partnership Project. "3rd Generation Partnership Project; Technical Specification Group Radio Access Network; UE Radio Access capabilities (Release 8)." 3GPP TS 25.306 V8.3.0, May 2008, Sophia Antipolis Valbonne, France.

3rd Generation Partnership Project. "3rd Generation Partnership Project; Technical Specification Group Radio Access Network; Physical channels and mapping of transport channels onto physical channels (FDD) (Release 7)." 3GPP TS 25.211 V7.6.0, May 2008, Sophia Antipolis Valbonne, France.

* cited by examiner

HARQ PROCEDURE WITH PROCESSING OF STORED SOFT-BITS

TECHNICAL FIELD

The invention generally relates to the field of mobile telecommunication networks. In particular, the present invention relates to employing a Hybrid Automatic Repeat Request (HARQ) procedure within a radio receiver.

BACKGROUND

In modern wireless receivers of Long Term Evolution (LTE), Worldwide Interoperability for Microwave Access (WiMAX) or Wideband Code Division Multiple Access (WCDMA) telecommunication systems, the received radio signal constellations are processed into soft-bits, each representing a probability of a bit being digital "zero" or digital "one". The signal constellations are associated with typical modulation schemes such as Quadrature Phase Shift Keying (QPSK), Quadrature Amplitude Modulation (QAM) 16 or QAM 64. Thereby, each QPSK constellation point produces 2 soft-bits, each QAM16 point constellation point produces 4 soft-bits and each QAM64 constellation point produces 6 soft-bits.

A decoder algorithm such as for instance a Turbo decoder or an Viterbi decoder is exploiting gain from redundancy coding. By using complex processing a decoder algorithm attempts to correctly reconstruct the (encoded) transmitted sequence with highest probability. If a whole data block is decoded correctly and a Cyclic Redundancy Check (CRC) has been passed, an Acknowledgement Information (ACK) is transmitted from the receiver back to the sender in order to inform the sender about a successful data block reception. Otherwise a Not Acknowledgement Information (NACK) is transmitted and, depending on the type of data traffic, the same data block is usually again transmitted from the sender to the receiver. This type of error-control method is called Hybrid Automatic Repeat Request (HARQ).

In particular in LTE, WiMAX and WCDMA telecommunication systems in case of a failed data block reception, retransmission usually follows. However, retransmission may not follow in certain types of data traffic such as for instance Voice over IP (VoIP) data traffic. Normally, if a retransmitted data block is identical to the previous at least partially unsuccessfully transmitted data block, the retransmitted data block would have similar probability for a correct reception as the original one (assuming (a) that fading effects were not affecting the channel quality and (b) that data blocks were being received independently, without being combined together). In order to additionally improve the chance of a successful data signal decoding in retransmission, various schemes may be used.

In standards employing the so called with HARQ "chase combining" method, the same bits are being retransmitted again but the least reliable bits (which were previously transmitted for example as bits 4 and 5 in QAM64) could be retransmitted at the most reliable bit positions 0 and 1. Depending on possibly selected constellation re-arrangements also the "bit position 2" and the "bit position 3" could be used for a reliable bit transfer. For instance in WCDMA QAM16 and QAM64 a proper selected constellation re-arrangement may allow the decoder to collect more reliable information about all bits coded on a specific constellation point.

Another possibility for realizing an effective data block transfer for example in LTE, WCDMA and other telecommunication systems is the so called HARQ "incremental redundancy" method. Thereby, rather than repeating the same bits (although using a different constellation mapping), instead more redundancy or parity bits are being sent. Of course, the number of the additional redundancy or parity bits typically depends on used coding rate and on the used interleaving scheme. A Turbo encoder requires a coding rate of ⅓, which means that three output bits are produced per single input bit.

Known puncturing or interleaving schemes are used in order to select for radio transmission only a subset of the overall encoded bits. Thereby, the effective coding rate may be changed from originally ⅓ to a coding rate of for example ⅔. In retransmissions, different interleaving parameters are selected and different sets of parity bits would be transmitted. Adding more parity bits may mean effectively changing the coding rate from ⅔ of the original transmission down to a coding rate of for example ½ or ⅓ for the retransmission. Typically, interleaving schemes are designed in such a way to avoid the same bits being sent at the same least reliable bit positions.

Due to air interface latencies and various system delays, a typical receiver employing HARQ must be able to handle multiple data blocks: one data block just being received and the other data blocks whose transmission has previously been failed and which are waiting for retransmission. Typically 4 to 6 HARQ processes are deployed. This means that the progress of transmitting 4 to 6 data blocks must be tracked.

When a data block fails a CRC check, its soft-bits are stored in memory and will be combined with new soft-bits being associated with a retransmission. The reason why the old soft-bits are stored is because they also contain valuable information about bit probabilities, which, when being combined with retransmitted soft-bits, will significantly increase the likelihood of successful data block decoding after retransmission. That is why retransmitted data blocks usually have a higher probability for a successful decoding.

In latest 3GPP standards, faster modulation schemes up to QAM64, Multiple Input Multiple Output (MIMO), larger bandwidths and more parallel data codes were added. All of these measures result in an increased data block size and consequently significantly increase the HARQ memory buffer requirements, which significantly increase the overall system memory allocation and thus, the cost for a corresponding radio receiver.

EP 1 337 066 B1 discloses a HARQ retransmission method in a telecommunication system, wherein data packets consisting of identical or partly identical modulation symbols encoded with a forward error correction (FEC) technique prior to transmission are retransmitted based on a repeat request and are subsequently bit-level combined on the basis of soft-information values (soft-bits). The calculation of the soft-bits being input into an FEC decoder comprises the steps of (a) calculating and buffering the soft-information values of the Most Significant Bits (MSBs) of each retransmitted data packet, (b) combining, for matching modulation symbols, the current soft-information values of the MSBs with the buffered soft-information values of at least one of the previous received transmitted packets and (c) calculating the soft information for at least some of the remaining bits from the combined soft-information values of the MSBs. On the receiver side this known HARQ retransmission method reduces the buffer size requirements.

SUMMARY

It is an object of the invention to provide a HARQ that allows for reducing the size of the HARQ buffer.

This object is achieved by the independent claims. Advantageous embodiments are described in the dependent claims.

According to a first aspect of the invention a HARQ procedure is provided comprising (a) calculating first soft-information values being associated with a first reception of the data block, (b) storing the calculated first soft-information values in a first buffer and (c) calculating second soft-information values being associated with a second reception of the data block, wherein the second reception results from a retransmission of the data block following the first reception. The provided method further comprises (d) rate matching a first soft data block comprising the calculated and stored first soft-information values, (e) rate matching a second soft data block comprising the calculated second soft-information values, and (f) performing a decoding of the received data block based on both the rate matched first soft data block and the rate matched second soft data block. Both rate matched soft data blocks might be concatenated before being transmitted to a decoder.

The described received data block determining method is based on the idea to store the calculated soft-information values, in the following also being referred to as soft-bits, before the rate matching (e.g. directly after soft bit calculation), e.g. by coupling the data output of a soft-bit calculation unit with any soft bit storage or buffer. The soft-bit calculation unit might also be denominated a combiner unit and/or a combiner and soft-bit calculation unit. Compared to storing (at least partly) rate matched soft-information, the described method allows to provide a significantly smaller buffer, as less information needs to be stored for the Hybrid Automatic Hybrid Request (HARQ) procedure. Thus, the buffer memory size requirements for the receiver can be significantly reduced.

The described rate matching may be carried out separately with the first soft-information values respectively the first soft data block and the second soft-information values respectively the second soft data block. This means that the information content of the calculated and stored first soft-bits and the information content of the calculated second soft-bits are combined with each other not before the described soft data block combination has been carried out.

By contrast to known HARQ procedures, wherein in accordance with for instance the 3GPP Standard 25.212 the content of the soft-bits is stored in a so-called virtual IR buffer being assigned to the rate matching, according to the described invention the content of the calculated is stored in buffers before a rate matching has been started.

With rate matching the data block size is matched to the radio frame(s). Initially a data block size (in bits) is selected, then data encoder increases the effective bit rate (typically 3 times) and then bits are punctured in order to decrease the data frame size to match that of the radio frame. Combination of 3:1 encoding and puncturing determines the effective coding rate. With deinterleaving and rate matching the soft-bit order is changed and the data block is placed in a larger buffer, in particular in a HARQ buffer. It is mentioned that soft-bits in such a HARQ buffer are "uncompressed" which means that for instance, if a known turbo decoder is used, the coding rate is expanded to the original 3:1 encoded rate, before the respective soft-bits are input into the turbo decoder.

In this respect it is mentioned that the coding rate r is defined by the ratio between (a) the number N of real data bits and (b) the sum of the number K of redundancy or parity bits and the number N of real data bits (r=N/(N+K)). Therefore, a coding rate of "½" means that N=K. Correspondingly, a coding rate of "one" would mean that there are no redundancy bits at all (K=0). Further, a coding rate of "⅓", which is used for instance for the already mentioned turbo encoding, means that N=K/2.

According to an embodiment of the invention the method further comprises concatenating the rate matched first soft data block with the rate matched second data block. Concatenating is to be understood as any generating any (resulting) data block comprising the information of both (input) data blocks, e.g. joining the data blocks together end by end such that the last symbol of the first data block adjoins the first symbol of the second data block, filling the concatenated block alternately with bits or symbols of both data blocks, or performing any suitable logical operation of both data block resulting in the concatenated data block. Thereby, determining the received data block comprises decoding the concatenated data block.

According to a further embodiment of the invention the method further comprises (a) performing a de-interleaving of the first soft-information values and (b) performing a de-interleaving of the second soft-information values. This means that soft-bit processing involves not only the above described rate matching but also a de-interleaving.

Generally speaking, with the described method the newly retransmitted soft-bits may be similarly processed (e.g. in a parallel process) with the former received and temporarily stored soft-bits. At the end, de-interleaved and rate matched soft-bits from previous and current transmission are added to the same buffer and sent to turbo decoder. This means that the soft-bit processing is accomplished by running a state machine comprising both a deinterleaver and rate matching unit two times. The buffer necessary for storing the rate matched information is thus only needed temporarily (i.e. for short time periods and can be released e.g. if after a first unsuccessful decoding attempt, a further transmission has to processed) and can be used for other processes otherwise. This means that many (e.g. 6 HARQ processes) can share one "big" buffer. Only the (compressed) soft bits need to be kept stored. This is in contrast with known HARQ soft-bit processing, where the soft bits are stored in a buffer after the rate matching has been started (and are kept stored in case of a further transmission process).

As described above, e.g. in case of a turbo encoder the soft-bits in such a buffer are "un-compressed" to a 3:1 encoding rate according to present standards. For instance, if a transmitted data block has a coding rate approaching 1, for each 1000 received bits, 3000 bits will be allocated in HARQ buffer after rate matching. The original 1000 bits may be placed in various locations of the HARQ buffer (e.g. at locations 2, 5, 6, 9, 13, 17, 19, . . . ) and the remaining positions will be filled with zeros. In subsequent retransmissions, if the above mentioned incremental redundancy scheme is used, those locations may be filled with additional parity or redundancy bits transmitted later. For example in retransmission, additional 1000 bits could be sent, for a total of 2000, changing effective coding rate from 1 to 0.5. Therefore instead of saving hypothetical 3000 bits after first transmission (which is the case in known HARQ procedures), only 1000 bits could be saved.

After retransmission, the original 1000 bits and the newly received 1000 bits would be effectively combined. An inherent part of the invention described in this document is therefore the algorithm which saves soft-bits immediately after the combiner and before de-interleaving and rate matching. During retransmission processing, the de-interleaver and rate matching algorithm will be run two (or more) times, i.e. to process saved soft-bits from the previous transmission(s) and processing newly calculated soft-bits from the recently received data block.

According to a further embodiment of the invention the method further comprises (a) receiving the data block at least three times and (b) apart from the last received data block one of the first and the second received data block is rejected and the other of the first and the second received data block is maintained. Thereby, the rejected data block has a lower reception quality than the maintained data block. This means that the weakest of the previous received data blocks but not the last received data block is rejected.

Generally speaking, only a selection of data block receptions is used for determining the received data block. With respect to the total number of data block receptions this selection comprises only a reduced number of data block receptions. Thereby, the memory requirements for carrying out the described HARQ method can be further reduced without significantly reducing the overall reception quality.

In order to achieve a reliable data block reception the best data block receptions may be used. The selection of the best data block reception may be carried out based on information about for instance a Signal to Noise Ration (SNR), a Signal to Interference and Noise Ratio (SINR) and/or a radio channel quality which was existent during the respective data block reception.

The selection of the best data block reception may also comprise simply to use the last data block receptions of a series of data block receptions. At this point it is noted that it may be the case that the quality of a retransmission is getting worse with further retransmissions. However, when combining such a worse retransmitted data block with a previously transmitted data block a correct data block determination might be accomplished. Specifically, if for instance a first data block has been received with a 10 dB signal, a second data block has been received with a 8.2 dB signal and a third data block has been received with a 8 dB signal, a combination of the first and the third received data block may yield a correct determination of the data block if a combination of the first and the second received data block has already been attempted but a correct data block determination has failed.

In this respect it is mentioned that the invention is not limited to a process involving one original data block transmission and exactly two data block retransmissions. The described data block determination could also be accomplished with only one data block re-transmission or with three ore even more data block re-transmissions. For instance if one original data block transmission and three data block re-transmissions are carried out one could store respectively process only three of the altogether four data block transmissions. Thereby, one could use the last transmitted respectively received data block and reject from the remaining three old received data block this data block, which has been received with the lowest reception quality.

According to a further embodiment of the invention the method further comprises (a) calculating further soft-information values being associated with a further reception of the data block, wherein with respect to the first reception of the data block the further reception of the data block results from a further previous transmission of the data block, (b) storing the calculated further soft-information values in a further buffer, and (c) rate matching a further soft data block comprising the calculated and stored further soft-information values. Thereby, the received data block is determined by decoding a combination of the rate matched first soft data block, the rate matched second soft data block and the rate matched further soft data block.

This may provide the advantage that soft-bit information from three or more at least partially successful data block receptions can be effectively used in order to determine the correct content of the received data block. The number of retransmissions and the associated calculated soft-information values being used for determining the received data block can be adapted to the used modulation and coding scheme and/or to the signal quality of the received radio signal. There is no principal limitation with respect to a maximal number of retransmissions which could be used.

Generally speaking, depending on memory or buffer availability and the data block size processed, a system designer may chose how many data blocks with previous retransmissions should be saved. Thereby, a flexible trade-off between system performance and memory utilization can be performed.

According to a further embodiment of the invention the method further comprises re-arranging the calculated and stored first soft-information values and/or re-arranging the calculated second soft-information values. Thereby, the order or the sequence of the respective soft-bits is changed. This may be also called a constellation re-arrangement.

The described constellation re-arrangement may provide the advantage that the reliability of the data block determination can be improved if the above mentioned HARQ "chase combining" method is used. This means that the same bits are being retransmitted again but least reliable bits (which were previously transmitted for example in "bit positions 4 and 5" in QAM64) could be retransmitted at a more reliable positions such as for instance the most reliable "bit positions 0 and 1" or at the "bit positions 2 and 3". Of course, this depends on the selected constellation re-arrangement. Thereby, the decoder may be allowed to collect more reliable information about all bits coded on a specific constellation point.

Depending on the selected modulation scheme different constellation rearrangements may be applied. The following tables 1 and 2 show different possible constellation re-arrangements for 16QAM and 64QAM:

TABLE 1

Constellation re-arrangement for 16QAM

| constellation version parameter b | Output bit sequence | Operation |
|---|---|---|
| 0 | $v_{p,k}v_{p,k+1}v_{p,k+2}v_{p,k+3}$ | None |
| 1 | $v_{p,k+2}v_{p,k+3}v_{p,k}v_{p,k+1}$ | Swapping Most Significant Bits (MSB) with Least Significant Bits (LSB) |
| 2 | $v_{p,k}v_{p,k+1}\overline{v_{p,k+2}v_{p,k+3}}$ | Inversion of the logical values of LSBs |
| 3 | $v_{p,k+2}v_{p,k+3}\overline{v_{p,k}v_{p,k+1}}$ | Swapping MSBs with LSBs and inversion of logical values of LSBs |

TABLE 2

Constellation re-arrangement for 64QAM

| constellation version parameter b | Output bit sequence | Operation |
|---|---|---|
| 0 | $v_{p,k}v_{p,k+1}v_{p,k+2}v_{p,k+3}v_{p,k+4}v_{p,k+5}$ | None |
| 1 | $v_{p,k+4}v_{p,k+5}\overline{v_{p,k+2}v_{p,k+3}}v_{p,k}v_{p,k+1}$ | Swapping MSBs and LSBs. Inversion of Middle Significant Bits |
| 2 | $v_{p,k+2}v_{p,k+3}\overline{v_{p,k+4}v_{p,k+5}}v_{p,k}v_{p,k+1}$ | Left circular shift of pair of Significant Bits. Inversion of MSBs |
| 3 | $\overline{v_{p,k}v_{p,k+1}}v_{p,k+2}v_{p,k+3}v_{p,k+4}v_{p,k+5}$ | Inversion of MSBs |

It is pointed out that in case more than one retransmission of the data block is employed the described constellation re-arrangement could of course also be applied with the further soft-information values.

According to a further embodiment of the invention the method further comprises discarding a selection of calculated first soft-information values before storing the calculated first soft-information values in the first buffer. According to this embodiment only certain soft-bits may be saved while other soft-bits are rejected. This is advantageous because in higher order modulations schemes such as QAM16 and QAM64 not all soft-bits have equivalent quality (reliability). The receiver designer could choose any percentage of soft-bits to be saved. For example in QAM64, all most reliable bits (bit positions 0 and 1) and some of the medium-reliable bits (bit positions 2 and 3) could be saved. Thereby, the percentage of saved soft-bits may depend on memory and performance trade-off considerations. This means that the savings could be configurable.

In other words, irrespective of the HARQ scheme used, certain soft-bits are more reliable (and thus, of higher quality) than others. Therefore, by performing a suitable constellation re-arrangement during retransmissions, different sets of encoded/mapped bits are getting the chance to be transmitted at the most valuable (and most reliable) bit positions 0 and 1. Since the most reliable bit positions depend on the selected modulation scheme it is always possible to identify which bits were sent at the most reliable positions. Therefore, only those bits may be saved in the respective HARQ buffer(s). During decoding a retransmitted data block only those selected most-reliable soft-bits from the previous transmission may be combined with the soft-bits received during retransmission. The remaining bits, which are usually a proportion of middle and/or least reliable bits from the previous transmission may be replaced by zeros.

It is pointed out that the described discarding procedure could also be carried out with the at least one further soft-information values. By discarding the at least reliable soft-bits the buffer size requirements could be further reduced.

It is further mentioned that retransmission and additional redundancy provided by it may result in approximately 3 dB of effective coding gain. Currently the worst case scenario from the HARQ buffer memory requirement perspective is when blocks are very large (QAM64, coding rate>0.9, large data blocks). Such transport formats are only possible in good conditions (high geometry, very low or zero relative speed between sender and receiver). In those circumstances, as much as 3 dB extra gain is not needed, because the radio channel link won't change that much between retransmission in order to lose 3 dB in signal quality. As a consequence it should be possible to reduce the number of soft-bits saving for retransmission in circumstances where trans-port formats are large.

In fast fading cases, where fading may result in a few dB drop in signal quality, usually more redundancy would be needed for retransmission to pass. However, fading channels practically always use smaller blocks, with lower coding rates. Therefore HARQ buffer requirement will be smaller and all soft-bits could be saved within available HARQ memory. As a consequence, selective dynamic discarding of certain soft-bits is easily feasible without performance loss.

According to a further embodiment of the invention the method further comprises inserting a zero value at a bit position, from which a selected calculated first soft-information value has been discarded. This may provide the advantage that even when certain comparatively unreliable soft-bits have been discarded the encoder can operate with unmodified data block formats.

According to a further embodiment of the invention the amount of discarded first soft-information values depends on a currently available buffer size and/or on a currently requested system performance. This may provide the advantage that the percentage of discarded soft-bits can be adapted appropriately to the current operational state of the receiver which is carrying out the described method. Thereby, a flexible trade-off between system performance and memory utilization may be accomplished.

According to a further embodiment of the invention the method further comprises reducing a resolution of the stored first soft-information values. This may be advantageous in particular when only certain more reliable soft-bits are saved in the first buffer and the less reliable soft-bits are discarded as described above.

Specifically, assuming that only certain more reliable QAM64/QAM16 soft-bits would be saved, their soft-bit values would be mostly large (due to their high reliability) and typically limited to max/min values due to quantization limitation. In that scenario it would be possible to reduce the bit-width (quantization) of the stored soft-bits. Depending on the resolution of the original soft-bits a saving of 50% could be possible with minimal performance loss.

In this respect it is pointed out that if only selected more reliable soft-bits are stored, their values will be large as they will be very reliable. Due to numerical representation and limited resolution, high percentage of those will be saturated to max/min numerical values. Therefore, reduction in their bit-width resolution will only slightly reduce information carried by those soft-bits, while allowing for, for example, a 50% memory size reduction.

For instance in a 4-bit representation, a majority of the most reliable soft-bits would concentrate around +7 and −7. It is therefore possible to reduce the resolution of the saved soft-bits. For example, their resolution could be changed from 4-bits down to 2-bits and their values rounded to +7, +2, −2, −7 levels. This would provide additional 50% buffer size saving with little or no performance loss.

It is mentioned that the described first soft-information values resolution reduction is of course also applicable for the above described further soft-information values, which are associated with the further reception of the data block.

It is further mentioned that even in QPSK, wherein the reliability of soft bits is uniform, it could still make sense to introduce a resolution reduction because thereby is could be possible to store more past retransmissions within a limited buffer size.

According to a further aspect of the invention there is provided a radio receiver arrangement for determining a received data block by employing a Hybrid Automatic Hybrid Request procedure. The provided radio receiver arrangement comprises (a) a calculation unit for calculating first soft-information values being associated with a first reception of the data block and for calculating second soft-information values being associated with a second reception of the data block, wherein the second reception results from a retransmission of the data block following the first reception. The provided radio receiver arrangement further comprises (b) a first buffer for storing the calculated first soft-information values, (c) a first rate matching unit for rate matching a first data block comprising the calculated and stored first soft-information values, and (d) a second rate matching unit for rate matching a second data block comprising the calculated first soft-information values. Further, the provided radio receiver arrangement comprises (e) a decoding unit for determining the received data block by decoding a combination of the rate matched first soft data block and the rate matched second soft data block.

Also the described radio receiver is based on the idea that calculated soft-information values or simply soft-bits can be stored directly at the output of a of the calculation unit. This means that the first buffer is located close to the combiner and the soft-information values are stored before the de-interleaving and, if applicable, a rate matching is carried out.

Compared to storing the calculated soft-information values after or within the first rate matching unit, the described method may provide the advantage that a much smaller amount of soft-bit information will need to be stored. Therefore, the memory size requirements for the first buffer can be significantly reduced.

The described radio receiver may be realized in any receiving network element of a telecommunication network. Specifically, the described radio receiver may be realized in a base station or in a relay node, which, in an upstream radio transmission, are receiving data blocks from a user equipment. Further, the described radio receiver may be realized in a user equipment, which in an downstream radio transmission scenario is receiving data blocks from a serving base station or a serving relay node.

According to an embodiment of the invention the calculation unit is further adapted for calculating further soft-information values being associated with a further reception of the data block, wherein with respect to the first reception of the data block the further reception of the data block results from a further previous transmission of the data block. Thereby, the radio receiver further comprises a further buffer for storing calculated further soft-information values and a further rate matching unit for rate matching a further soft data block comprising the calculated and stored further soft-information values. Further, the decoding unit is adapted for determining the received data block by decoding a combination of the rate matched first soft data block, the rate matched second soft data block and the rate matched further soft data block.

The described radio receiver may allow for employing the calculated soft-bit information from three or more at least partially successful data block receptions in order to determine the correct content of the received data block. Thereby, the reliability of a data block determination may be effectively enhanced.

The number of retransmissions and the associated calculated soft-information values being used for determining the received data block can be adapted to the currently used modulation and coding scheme and/or to the signal quality of the received radio signal. There is no principal limitation with respect to a maximal number of retransmissions which could be used.

According to a further aspect of the invention there is provided a radio communication system comprising (a) a radio transmitter for transmitting an encoded data block and (b) a radio receiver arrangement as described above for receiving the encoded data block and for determining the received data block by employing a Hybrid Automatic Hybrid Request procedure.

According to a further aspect of the invention there is provided a computer-readable medium on which there is stored a computer program for determining a received data block by employing a Hybrid Automatic Hybrid Request procedure. The computer program, when being executed by a data processor, is adapted for controlling or for carrying out the above described method for determining a received data block by employing a Hybrid Automatic Repeat Request procedure.

The computer-readable medium may be readable by a computer or a processor. The computer-readable medium may be, for example but not limited to, an electric, magnetic, optical, infrared or semiconductor system, device or transmission medium. The computer-readable medium may include at least one of the following media: a computer-distributable medium, a program storage medium, a record medium, a computer-readable memory, a random access memory, an erasable programmable read-only memory, a computer-readable software distribution package, a computer-readable signal, a computer-readable telecommunications signal, computer-readable printed matter, and a computer-readable compressed software package.

According to a further aspect of the invention there is provided a program element for determining a received data block by employing a Hybrid Automatic Hybrid Request procedure. The program element, when being executed by a data processor, is adapted for controlling or for carrying out the above described method for determining a received data block by employing a Hybrid Automatic Repeat Request procedure.

The program element may be implemented as a computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The program element may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
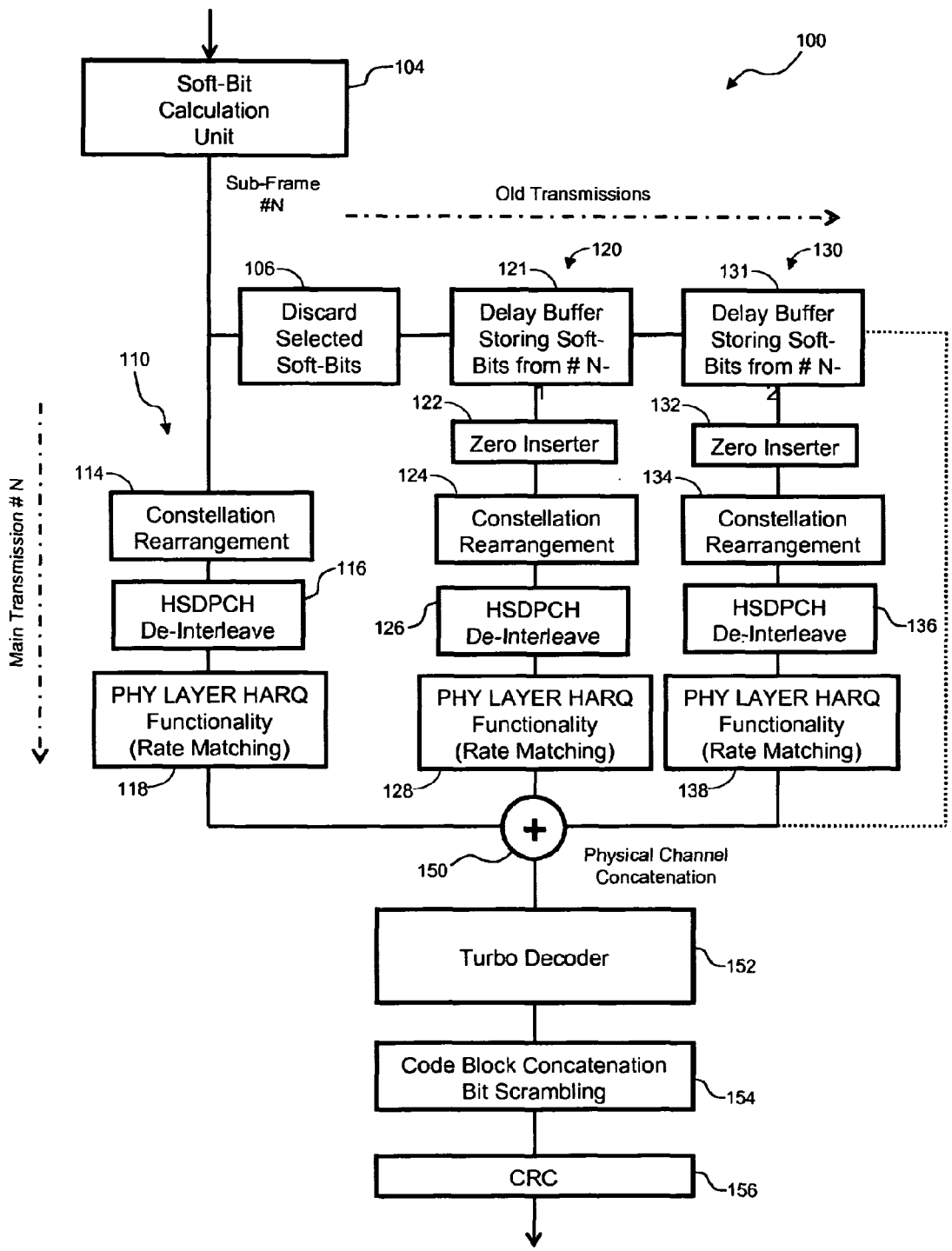
FIG. 1 shows a block diagram of a radio receiver arrangement in accordance with an embodiment of the invention.

The illustration in the drawing is schematically. In different drawings, similar or identical elements may be provided with the same reference signs.

FIG. 1 shows a schematic block diagram of a radio receiver arrangement 100. The radio receiver arrangement 100 may be implemented in a base station of a cellular telecommunication network for receiving uplink data from a user equipment. The radio receiver arrangement 100 may also be implemented in a user equipment receiving downlink data from a base station or from a relay node of a cellular telecommunication network.

The radio receiver arrangement 100 comprises a soft-bit calculation unit 110, which during operation of the radio receiver arrangement 100 receives digital data from receiver specific equipment comprising an antenna, a radio frequency unit, an receiver, an equalizer etc. For each data block, which has been received, the unit 110 processes soft-information values (=soft-bits) each representing a probability of a bit being digital "zero" or digital "one". This is done for each received data block. If in accordance with the basic principles of Automatic Repeat Request (ARQ) or Hybrid Automatic Repeat Request (HARQ) one and the same data block is received more than one time, the soft-bit calculation unit 110 performs this soft-bit processing for each received data block, i.e. for the originally by the respective radio transmitter transmitted data block and for each re-transmitted data block. Since a request for retransmission takes some time in order to be completed, soft-bits being assigned to different data blocks may be handled in parallel. In case of one or more requested re-transmissions the data block handling is accomplished in an interleaved manner. This means that soft-bits having been generated from original and retransmitted different data blocks are processed in an interleaving manner.

It is pointed out that in FIG. 1 only the soft-bit processing is shown, which is associated with one and the same received data block. Specifically, the soft-bit processing is shown, which is associated with (a) a currently received and for the second time re-transmitted data block, (b) a previously received and for the first time re-transmitted data block and (c) a more previously received and originally transmitted data block. As can be seen from FIG. 1, within the radio receiver arrangement 100 (a) the soft-bits being associated with the currently received data block are processed in a first processing branch 110, (b) the soft-bits being associated with the previously received data block are processed in a second processing branch 120 and (c) the soft-bits being associated with the more previously received data block are processed in a third processing branch 120.

It is mentioned that the invention described in this document is not limited to the processing of exactly the soft-bits being obtained from three data blocks, which are associated with different transmissions of one and the same data block. The described data block determination could also be accomplished with only one data block re-transmission or with three ore even more data block re-transmissions. The latter is indicated with the dashed line on the right side of FIG. 1.

In particular in high-order modulations, due to Grey-coding and mapping scheme which is used, certain soft-bits are much more reliable (and therefore valuable for the decoder) than the remaining ones. Out of four coded bits 0123 (per QAM16 constellation point) or six coded bits 012345 (per QAM64 constellation point), bits 01 are the most reliable and have the highest mean soft-bit amplitudes. The remaining bits have lower mean soft-bit amplitudes and therefore a lower decoding value.

Figure 2:
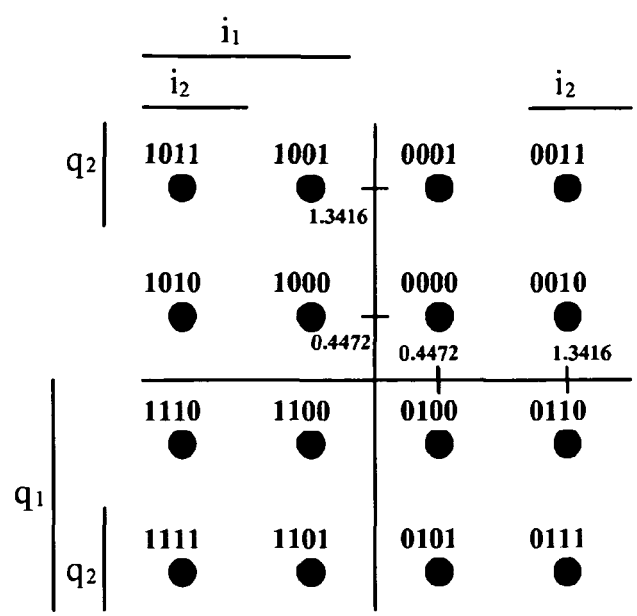
FIG. 2 shows constellation de-mapping in accordance with an embodiment of the invention.

FIG. 2 presents how QAM16 constellation de-mapping (process of producing soft-bits) is done. In that FIGURE, "i" and "q" represent mapping range of digital "ones". Out of four encoded QAM16 bits (per single point), "i1" and "q1" are the most reliable ones (also known as bits number "0" and "1"). Soft-bits "i2" and "q2" are less reliable and are known as bits "2" and "3". It is mentioned that in QAM64, constellation is even denser with more points and additional, least reliable bits "4" and "5" are produced.

Accordingly, it is possible to discard certain soft-bits before continuing the further soft-bit processing without or with only marginally reducing the reliability of the finally determined data block. Of course, if certain soft-bits are discarded, then it should be those of lowest reliability.

Based on these considerations the radio receiver arrangement 100 depicted in FIG. 1 is provided with a soft-bit discarding unit 106 which according to the embodiment described here discards the least reliable soft bits. Thereby, the percentage of soft-bits discarded may depend on system architecture and/or on the transport format i.e. the currently used modulation and coding scheme. In this respect it is mentioned that a dynamic discarding of certain soft-bits is only possible if a multiple-pass de-interleaving and a rate-matching processing is implemented, otherwise, in a decompressed HARQ buffer, it is not know which soft-bits are more reliable.

Put in other words, the soft-bit discarding unit 106 may also be denominated a reliable bits selector, which discards the less reliable soft-bits from the output of the soft-bit calculation unit 104. In case of 16QAM, these could be the soft-bits i1 q1 as mentioned before. In case of 64QAM, these could be the first 2 or 3 or 4 soft-bits.

It is mentioned that when using a Quadrature Phase Shift Keying (QPSK) modulation scheme all soft-bits typically have the same reliability. However, also in this case a discarding of soft-bits may be carried out which however may be not as effective as a specific discard of only little reliable soft-bits.

After the optional soft-bit discarding the remaining soft-bits obtained from the original and more previously received data block are stored in a delay buffer 131. Accordingly, the soft-bits which have been processed from the first retransmitted data block are stored in a delay buffer 121.

Before further processing the intermittent soft-bits stored in the delay buffer 121 and 131 a zero insertion is performed with the zero inserting unit 122 and the zero inserting unit 132, respectively. As can be seen from FIG. 1, the zero inserting unit 122, which is connected to the delay buffer 121, is assigned to the second processing branch 120. Accordingly, the zero inserting unit 132, which is connected to the delay buffer 131, is assigned to the third processing branch 130.

Descriptive speaking, the zero inserting units 122 and 132 perform the reverse function of the soft-bit discarding unit 106. When reading from the delay buffer 121 or 131, the respective zero inserting units 122, 132 insert "zero" bits in place of those soft-bits that were discarded by the soft-bit discarding unit 106.

In the following the further processing of the various soft-bits, which are associated with the altogether three data block transmissions, is described:

The soft-bits which have been calculated based on the currently received and for the second time re-transmitted data block are fed to a constellation rearrangement unit 114. Accordingly, the soft-bits which have been calculated based on the previously received and for the first time re-transmitted data block (after an appropriate soft-bit discarding and a complementary zero insertion) are fed to a constellation rearrangement unit 124. Just as well the soft-bits which have been calculated based on the more previously received and originally transmitted data block (also after an appropriate soft-bit discarding and a complementary zero insertion) are fed to a constellation rearrangement unit 134.

With the various constellation rearrangement units 114, 124 and 134 the order or the sequence of the respective soft-bits is changed. Thereby, as has already been mentioned above, a downstream arranged decoder may be allowed to collect more reliable information about all bits coded on a specific constellation point.

For the sake of conciseness the following soft-bit processing is only described with respect to the first processing branch 110. However, it is explicitly pointed out that according to the embodiment described here the soft-bit processing being associated with the second processing branch 120 and the third processing branch 130 is the same.

The further soft-bit processing comprises a de-interleaving which is carried out in de-interleaving units 116, 126 and 136. According to the embodiment described here the de-interleaving is accomplished in the context of High Speed Downlink Packet Access (HSDPCH).

After performing the de-interleaving a rate matching is carried out with then de-interleaved code blocks provided by the de-interleaving units 116, 126 and 136. The rate matching is carried out with the rate matching units 118, 128 and 138. Thereby, the number of encoded bits being included in one code block is adapted to the currently available data transport capacity. The transport capacity on air is a function in particular of the bandwidth, the modulation scheme and/or the presence and absence of control information.

It is mentioned that in accordance with the 3GPP standard specification 25.212 each of the rate matching units 118, 128, 138 may also be provided with a virtual buffer, which would also be capable of temporarily storing soft-bits. However, by contrast to the temporal soft-bit buffering in the delay buffers 121 and 131, a temporal storage in the virtual buffer would require much more storage capacity because of the already performed rate matching, which typically significantly increases the number of bits.

After having successfully performed the rate matching for the soft-bits being assigned to the various processing branches 110, 120 and 130 the respective sequences of soft-bits are concatenated in a physical channel concatenation unit 150. The resulting concatenated soft-bits are then fed to a decoder, which according to the embodiment described here is a known turbo decoder 152. Thereafter, the resulting decoded data are fed to a code block concatenation and bit scrambling unit 154. A code block being output from the code block concatenation and bit scrambling unit 154 is passed to a Cyclic Redundancy Checking (CRC) unit 156. If a corresponding CRC check being performed in this CRC unit 156 is successful, the output of the CRC unit 156, which is the output of the entire radio receiver arrangement 100, represents the determined received data block.

At this point it is mentioned that the described invention is of course not limited for a soft-bit processing employing a turbo decoder. Of course also other decoders such as for instance a Viterbi decoder could used.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

LIST OF REFERENCE SIGNS 100 radio receiver arrangement
104 Soft-Bit calculation unit
106 Soft-Bit discarding unit
110 first processing branch
114 Constellation rearrangement unit
116 De-interleaving unit
118 Rate matching unit
120 second processing branch
121 delay buffer
122 Zero inserting unit
124 Constellation rearrangement unit
126 De-interleaving unit
128 Rate matching unit
130 third processing branch
131 delay buffer
132 Zero inserting unit
134 Constellation rearrangement unit
136 De-interleaving unit
138 Rate matching unit
150 Physical channel concatenation unit
152 Turbo decoder
154 Code Block concatenation and Bit scrambling unit
156 Cyclic Redundancy Checking unit

The invention claimed is:

1. A method for evaluating a received data block by employing a Hybrid Automatic Repeat Request procedure, the method comprising:
calculating first soft-information values associated with a first reception of the data block;
storing the calculated first soft-information values in a first buffer;
calculating second soft-information values associated with a second reception of the data block, wherein the second reception results from a retransmission of the data block following the first reception;
rate matching a first soft data block comprising the stored first soft-information values;
rate matching a second soft data block comprising the calculated second soft-information values;
decoding a combination of the rate matched first soft data block and the rate matched second soft data block.

2. The method of claim 1 further comprising:
concatenating the rate matched first soft data block with the rate matched second data block;
wherein the decoding comprises decoding the concatenated first and second soft data block.

3. The method of claim 1 further comprising:
de-interleaving the first soft-information values;
de-interleaving the second soft-information values.

4. The method of claim 1 further comprising:
receiving the data block at least three times so as to receive, in order, the first reception of the data block, the second reception of the data block, and a third reception of the data block;
maintaining data associated with the third reception of the data block;
rejecting data associated with one of the first and the second receptions of the data block and maintaining data associated with the other of the first and second receptions of the data block, wherein the one reception of the data block has a lower reception quality than the other reception of the data block.

5. The method of claim 1 further comprising:
calculating further soft-information values associated with another reception of the data block, wherein with respect to the first reception of the data block, the another reception of the data block results from a previous transmission of the data block;
storing the calculated further soft-information values in a further buffer;
rate matching a further soft data block comprising the calculated and stored further soft-information values;
wherein the decoding the data block comprises decoding a combination of the rate matched first soft data block, the rate matched second soft data block, and the rate matched further soft data block.

6. The method of claim 1 further comprising at least one of:
re-arranging the stored first soft-information values;
re-arranging the calculated second soft-information values.

7. The method of claim 1 further comprising discarding a selection of calculated first soft-information values before the storing the calculated first soft-information values in the first buffer.

8. The method of claim 7 further comprising inserting a zero value at a bit position, from which a selected calculated first soft-information value has been discarded.

9. The method of claim 7 wherein an amount of discarded first soft-information values depends on at least one of:
a currently available buffer size;
on a currently requested system performance.

10. The method of claim 1 further comprising reducing a resolution of the stored first soft-information values.

11. A radio receiver arrangement for determining a received data block by employing a Hybrid Automatic Hybrid Request procedure, the radio receiver arrangement comprising:
a calculation unit configured to:
calculate first soft-information values associated with a first reception of the data block; and
calculate second soft-information values associated with a second reception of the data block, wherein the second reception results from a retransmission of the data block following the first reception;
a first buffer configured to store the calculated first soft-information values;
a first rate matching unit configured to rate match a first data block comprising the calculated and stored first soft-information values;
a second rate matching unit configured to rate match a second data block comprising the calculated first soft-information values;
a decoding unit configured to determine the received data block by decoding a combination of the rate matched first soft data block and the rate matched second soft data block.

12. The radio receiver arrangement of claim 11:
wherein the calculation unit is further configured to calculate further soft-information values associated with another reception of the data block, wherein with respect to the first reception of the data block the another reception of the data block results from a previous transmission of the data block;
further comprising a further buffer configured to store the calculated further soft-information values;
further comprising a further rate matching unit configured to rate match a further soft data block comprising the calculated and stored further soft-information values;
wherein the decoding unit is configured to determine the received data block by decoding a combination of the rate matched first soft data block, the rate matched second soft data block, and the rate matched further soft data block.

13. A radio communication system comprising:
a radio transmitter configured to transmit an encoded data block;
a radio receiver arrangement configured to receive the encoded data block and for determining the received data block by employing a Hybrid Automatic Hybrid Request procedure, the radio receiver arrangement comprising:
a calculation unit configured to:
calculate first soft-information values associated with a first reception of the data block; and
calculate second soft-information values associated with a second reception of the data block, wherein the second reception results from a retransmission of the data block following the first reception;
a first buffer configured to store the calculated first soft-information values;
a first rate matching unit configured to rate match a first data block comprising the calculated and stored first soft-information values;
a second rate matching unit configured to rate match a second data block comprising the calculated first soft-information values;
a decoding unit configured to determine the received data block by decoding a combination of the rate matched first soft data block and the rate matched second soft data block.

14. A computer program product stored in a non-transient computer readable medium for controlling a data processor, the computer program product comprising software code instructions which, when run on the data processor, causes the data processor to determine a received data block by employing a Hybrid Automatic Hybrid Request procedure by:
calculating first soft-information values associated with a first reception of the data block;
storing the calculated first soft-information values in a first buffer;
calculating second soft-information values associated with a second reception of the data block, wherein the second reception results from a retransmission of the data block following the first reception;
rate matching a first soft data block comprising the stored first soft-information values;
rate matching a second soft data block comprising the calculated second soft-information values;
decoding a combination of the rate matched first soft data block and the rate matched second soft data block.

* * * * *